US012576292B1

(12) United States Patent
Scepaniak et al.

(10) Patent No.: US 12,576,292 B1
(45) Date of Patent: Mar. 17, 2026

(54) WINCH

(71) Applicant: Scepaniak IP Holdings, LLC, Waite Park, MN (US)

(72) Inventors: Kurtis D. Scepaniak, Cold Spring, MN (US); Michael S. Marquette, Melrose, MN (US); Travis M. Marquette, Bowlus, MN (US)

(*) Notice: Subject to any disclaimer, the term of this patent is extended or adjusted under 35 U.S.C. 154(b) by 471 days.

(21) Appl. No.: 18/330,423

(22) Filed: Jun. 7, 2023

Related U.S. Application Data

(60) Provisional application No. 63/350,016, filed on Jun. 7, 2022.

(51) Int. Cl.
*B66D 5/34* (2006.01)
*A62B 35/00* (2006.01)
*E04G 21/32* (2006.01)

(52) U.S. Cl.
CPC ...... *A62B 35/0093* (2013.01); *A62B 35/0068* (2013.01); *B66D 5/34* (2013.01); *E04G 21/3295* (2013.01)

(58) Field of Classification Search
CPC ........ A62B 1/10; A62B 35/0093; B66D 3/10; B66D 5/34; B66D 2700/05; B65H 2403/07
See application file for complete search history.

(56) References Cited

U.S. PATENT DOCUMENTS

| | | | | |
|---|---|---|---|---|
| 1,111,489 A | | 9/1914 | Palmer | |
| 1,348,940 A | | 8/1920 | Gorman | |
| 1,454,398 A | | 5/1923 | Philip | |
| 2,530,586 A | | 11/1950 | Smith | |
| 2,686,491 A | | 8/1954 | Ohmstede | |
| 3,021,924 A | | 2/1962 | Patterson, III et al. | |
| 3,581,586 A | | 6/1971 | Blackburn | |
| 3,937,415 A | * | 2/1976 | Prinz | A01K 89/0165 242/395 |
| 3,939,729 A | * | 2/1976 | Brockelsby | B66D 5/34 74/577 M |
| 4,042,066 A | * | 8/1977 | Noone | A62B 1/02 180/9 |

(Continued)

FOREIGN PATENT DOCUMENTS

| | | |
|---|---|---|
| CN | 112978515 A | 6/2021 |
| EP | 2796403 A | 10/2014 |

(Continued)

*Primary Examiner* — Noah Chandler Hawk
(74) *Attorney, Agent, or Firm* — Albert W. Watkins

(57) ABSTRACT

A winch has a cable reel, a winch body capturing the cable reel, and an indexing lock. Two separately actuated pawls provide a first level of fail-safe protection. A drive coupler enables rapid torque wrench cable tension adjustment. Locking pin holes on the cable reel and winch body are arranged so a locking member can pass through only one visible winch body locking pin hole, with the other visible holes at least partially blocked, independent of pawl position. The locking pin provides a second level fail safe. As the cable reel is rotated by the drive coupler, even by a small amount less than required for a single pawl ratchet tooth displacement, another visible winch body locking pin hole will align and open. As a result, very precise cable tension and reel position can be preserved by insertion of the locking pin into the only open locking pin hole.

20 Claims, 5 Drawing Sheets

(56) References Cited

U.S. PATENT DOCUMENTS

| | | | | |
|---|---|---|---|---|
| 4,390,161 | A | 6/1983 | Nelson | |
| 4,406,351 | A * | 9/1983 | Littlejohn | A62B 1/02 182/47 |
| 4,566,674 | A * | 1/1986 | Ebey | B66D 1/06 74/405 |
| 5,528,803 | A | 6/1996 | Frisoli | |
| 5,800,105 | A * | 9/1998 | Stump | B60P 7/083 410/101 |
| 6,036,146 | A | 3/2000 | Paterson | |
| 6,079,182 | A | 6/2000 | Ellenberger | |
| 6,431,482 | B1 | 8/2002 | Ikuta | |
| 6,431,525 | B1 * | 8/2002 | Roll | B66D 1/04 74/411.5 |
| 6,585,080 | B2 | 7/2003 | Murray | |
| 7,226,038 | B1 | 6/2007 | Wickstrom | |
| 7,325,509 | B2 | 2/2008 | Gordon et al. | |
| 7,806,232 | B2 | 10/2010 | Thomas et al. | |
| 7,967,278 | B2 | 6/2011 | Anderson et al. | |
| 8,459,615 | B2 | 6/2013 | Anderson et al. | |
| 8,579,259 | B2 | 11/2013 | Okerlund et al. | |
| 8,882,016 | B1 | 11/2014 | Melvin | |
| 9,475,647 | B2 | 10/2016 | de Lore et al. | |
| 9,567,186 | B2 | 2/2017 | Kucera | |
| 9,630,682 | B1 | 4/2017 | Yost | |
| 10,336,408 | B1 | 7/2019 | Jankowski | |
| 10,549,152 | B2 | 2/2020 | Walker | |
| 11,203,512 | B2 | 12/2021 | Key et al. | |
| 2005/0252719 | A1 * | 11/2005 | May | B66B 9/187 182/48 |

FOREIGN PATENT DOCUMENTS

| | | | |
|---|---|---|---|
| EP | 3656725 | A1 | 5/2020 |
| KR | 20110109143 | A | 10/2011 |
| KR | 101993872 | B1 | 6/2019 |
| SU | 473664 | A1 | 6/1975 |

* cited by examiner

WINCH

CROSS REFERENCE TO RELATED APPLICATIONS

The present application claims the benefit of U.S. provisional patent application 63/350,016 filed Jun. 7, 2022, the teachings and entire contents which are incorporated herein by reference.

BACKGROUND OF THE INVENTION

1. Field of the Invention

The present invention pertains generally to safety devices, and more particularly to temporary protective expedients for buildings. In a most preferred manifestation, the present invention is a roof edge safety system.

2. Description of the Related Art

When working on top of buildings, one of the inevitabilities is the risk of a worker succumbing to gravity, further compounded by the great distance from the ground. Due to the nature of this risk, the U.S. Occupational Safety and Health Administration (OSHA) and similar agencies in other jurisdictions have many rules, regulations, and requirements dealing with roof edge alert and protection devices. When a person is supported by the building, this risk can be substantially reduced. To ensure that a person remains on the rooftop of a building, a wide variety of equipment and techniques have been deployed.

One common support is a cable or tether connected between a safety harness and an anchor point. This approach has found widespread acceptance for some applications, particularly where footing can be challenging such as with significantly sloped roofs and early in the construction of a building when only the framing is installed. As may be appreciated, while this technique is very effective at keeping a person on the roof, the cable itself is very restrictive, interfering with the person's ability to quickly and freely move about and work. In some instances, the cable will in fact create hazards, particularly when machinery and equipment are also operating on the roof or many workers are moving about. In other words, in some instances the cable anchor can actually interfere with the safety of workers on the roof.

For relatively flatter roofs and similar flatter surfaces, some artisans have solved this problem with a pole and flag system, which uses multiple flags on a rope, and small poles deployed six to ten feet inside the roof edge. However, the poles used for this purpose are only effective at alerting a person to the edges and will not prevent someone from falling off the edge. When the person is working on the rooftop, additional protection is highly desired, as their focus is elsewhere. They might literally step backward off of the roof and not see the flags on the rope until they are already free-falling.

Another type of safety equipment deployed is a roof-edge barrier that is designed to contain a person on the roof, in the manner of a fence or barricade. Such roof-edge barriers must be capable of retaining the weight of a worker accidentally colliding with the barrier, including a reasonable safety margin. To provide such a strong barrier, many of these are complicated temporary barriers that are bolted or screwed into the roof or building, and require substantial alignment.

Others prior art systems are easy to set up, but can be prone to failure and therefore provide little protection.

One approach has been to anchor a number of stanchions or posts around the pertinent working perimeter, and to provide at least one and commonly a plurality of tensioned cables that span the spaces between these stanchions. Exemplary U.S. patents, the teachings which are incorporated herein by reference, include: 6,036,146 by Paterson, entitled "Safety cable system"; 6,585,080 by Murray, entitled "Modular stanchion holder for removable guard rail system"; and 7,806,232 by Thomas et al, entitled "Roof perimeter cable guard system". In addition, an alternative roof edge safety system incorporating cables is disclosed in commonly owned US pending patent application Ser. No. 18/298,367, entitled "Roof Edge Safety System" and filed on Apr. 10, 2023, the teachings which are incorporated herein by reference.

As illustrated in the Paterson patent and known in the prior art, a winch is commonly used to tension the cable in such systems. Whether to overcome the requirements of OSHA or other locales, or more simply and importantly for improved worker safety, one very fundamental requirement of these cable systems is that winches and other tensioning devices for the rope or cable hold the cable taught when so intended. Because a person's life is on the line, there is no room for winch failure or loss of tension in these cable systems.

A very common type of winch provides a crank handle or other drive mechanism configured to rotate a spool around which the cable is wound. A safety pawl is provided that engages with a gear coupled to the spool. As the spool is wound tighter, the pawl will successively advance from one gear tooth to the next. When tension is released from the crank handle, the safety pawl will stay engaged and prevent the spool from unwinding. To release tension, the safety pawl is pivoted, typically manually, out of engagement with the spool-coupled gear.

One important consideration for keeping the cable taught when intended is that there be more than one catch within a winch that keeps the cable tight. The reason for this need is that a single point safety catch is too easy to accidentally release, with potential impacts by tools, machines, or persons, or even something as mundane as having clothing hook on a part of the winch. The winch should not be released by impacting a single part or component of the winch. Consequently, the prior art winches relying solely upon the safety pawl to maintain tension are inadequate.

The Paterson patent incorporated by reference herein above attempts to address the limitations of the prior art pawl-release by instead providing a locking pin that passes through one set of a plurality of holes formed in the spool and through a single set of holes in the fixed position fork arms. When so engaged, the locking pin prevents any rotation of the spool relative to the fork arms. Unfortunately, the locking pin also is a single point safety catch that is too easy to accidentally release, with potential impacts by tools, machines, or persons, or even something as mundane as having clothing hook on the locking pin.

Another important consideration for keeping the cable taught when intended is that the tension be very precisely generated. Unfortunately, due to the desired minimal stretch in roof edge safety cables, the difference between ideal tension and the cable being over-tightened is consequential. Thus, when using a prior art pawl winch and when the current pawl click will all too often lead to just too much play and sag in the cable, and yet advancing the minimum one full pawl click from under-tensioned will all too often result in the cable being over-tightened. Therefore it is very desirable to have more stopping points than can be achieved with a prior art pawl, with very little rotational difference between each stopping point.

Some alternative prior art winches rely on friction to lock the spool in position. One significant benefit of friction-stopped winches is the ability to stop the winch spool in an infinite number of stopping positions. As a result, in theory, a person could perfectly tension the cables for a robust roof edge safety system. One type of friction winch uses thrust bearings to provide static forces to lock up the winch. These winches do not work as desired for roof edge safety systems because they are prone to slippage if the winch itself is accidentally impacted. Other winches rely on brake pads similar to those utilized by automobiles, and these are also prone to slipping, particularly if oils or other foreign materials end up on the pads. Both of these friction-based winches are also prone to minor slipping during engagement, which can result in lower tension on the cables than needed to keep the system safe.

Exemplary U.S. and Foreign patents and published applications illustrating various winch constructions for purposes other than roof edge safety systems, the teachings which are incorporated herein by reference, include: 1,111,489 by Palmer, entitled “Clothes line reel”; 1,348,940 by Gorman, entitled “Stump-puller”; 1,454,398 by Mackenzie, entitled “Pawl and ratchet power appliance”; 2,530,586 by Smith, entitled “Anchor Winch”; 2,686,491 by Ohmstede, entitled “Boat mooring assembly”; 3,021,924 by Patterson et al, entitled “Reverse motion preventing mechanism”; 3,581,586 by Blackburn, entitled “Ratchet winch”; 4,390,161 by Nelson, entitled “Winch drive and brake mechanism”; 5,528,803 by Frisoli, entitled “Double locking cinch sack winch lock”; 6,036,146 by Paterson, entitled “Safety cable system”; 6,431,482 by Ikuta, entitled “Dual-bearing reel spool-locking mechanism”; 7,226,038 by Wickstrom, entitled “Load arrestor, lifting system and method”; 7,325,509 by Gordon et al, entitled “Retractable mooring line device”; 7,967,278 by Anderson et al, entitled “Winch Assembly”; 8,579,259 by Okerlund et al, entitled “Two speed winch assembly”; 8,882,016 by Melvin, entitled “Cable and cord winding and storage system”; 9,475,647 by de Lore et al, entitled “Winch drum tension isolation system”; 9,567,186 by Kucera, entitled “Motorized hose reel with anti-rotation interlock”; 9,630,682 by Yost, entitled “Rope storage system”; 10,336,408 by Jankowski, entitled “Method and device for locking rope winch”; 10,549,152 by Walker, entitled “Rotational and linear resistance force exercise apparatus”; 11,203,512 by Key et al, entitled “Winch drum tension isolation system”; CN112978515A; EP2796403A1 by Scherwinski et al, entitled “Winch with a rope drum and emergency stop device”; EP3656725A1 by Cardona, entitled “Fail safe bar for clutch type brake adjustment”; KR101993872B1; KR20110109143A; and SU473664A1.

As may be apparent, in spite of the enormous advancements and substantial research and development that has been conducted, there still remains a need for a winch that provides positive and redundant locking of the spool in a very precise position so as to allow an operator to precisely set and maintain a desired tension in the safety cables of a roof edge safety system.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a building and a roof edge safety system. The building comprises at least one elevational wall and at least one roof adjoining the at least one elevational wall. The roof edge safety system comprises at least one roof edge safety support, at least one winch support, at least one winch supported by the at least one winch support above the roof, and a tensioned cable. The at least one roof edge safety support has a standard coupled adjacently to the at least one roof and rising to a top elevation above the roof, and at least one rope guide. The at least one winch support has a standard coupled adjacently to the at least one roof and rises to a top elevation above the roof. The at least one winch has a cable reel defining an axis of rotation, a winch body located adjacent the cable reel and affixed to the standard, and a locking member. The cable reel has a plurality of cable reel locking pin holes each displaced by a radius from the axis of rotation. The winch body has a plurality of winch body locking pin holes each displaced by a radius from the axis of rotation. The locking member in a first configuration passes through a first one of the plurality of cable reel locking pin holes and a first one of the plurality of winch body locking pin holes while a second one of the plurality of cable reel locking pin holes and a second one of the plurality of winch body locking pin holes are angularly offset about the axis of rotation from each other by a first offset angle. In a second configuration, the locking member passes through the second one of the plurality of cable reel locking pin holes and the second one of the plurality of winch body locking pin holes while the first one of the plurality of cable reel locking pin holes and the first one of the plurality of winch body locking pin holes are angularly offset about the axis of rotation from each other by a second offset angle, wherein an absolute value of the second offset angle is equal to an absolute value of the first offset angle. The tensioned cable is wrapped about the cable reel and passes through the at least one rope guide.

In a second manifestation, the invention is a winch. The winch has a cable reel defining an axis of rotation, a winch body located adjacent the cable reel and affixed to the standard, and a locking member. The cable reel has a plurality of cable reel locking pin holes each displaced by a radius from the axis of rotation. The winch body has a plurality of winch body locking pin holes each displaced by a radius from the axis of rotation. The locking member in a first configuration passes through a first one of the plurality of cable reel locking pin holes and a first one of the plurality of winch body locking pin holes while a second one of the plurality of cable reel locking pin holes and a second one of the plurality of winch body locking pin holes are angularly offset about the axis of rotation from each other by a first offset angle. In a second configuration, the locking member passes through the second one of the plurality of cable reel locking pin holes and the second one of the plurality of winch body locking pin holes while the first one of the plurality of cable reel locking pin holes and the first one of the plurality of winch body locking pin holes are angularly offset about the axis of rotation from each other by a second offset angle, wherein an absolute value of the second offset angle is equal to an absolute value of the first offset angle. The tensioned cable is wrapped at least partially about the cable reel.

In a third manifestation, the invention is, in combination, a building and a roof edge safety system. The building comprises at least one elevational wall and at least one roof adjoining the at least one elevational wall. The roof edge safety system comprises at least one roof edge safety support, at least one winch support, at least one winch supported by the at least one winch support above the roof, and a tensioned cable. The at least one roof edge safety support has a standard coupled adjacently to the at least one roof and rising to a top elevation above the roof, and at least one rope guide. The at least one winch support has a standard coupled adjacently to the at least one roof and rises to a top elevation above the roof. The at least one winch has a cable reel defining an axis of rotation, a winch body located adjacent the cable reel and affixed to the standard, a locking member, a first pinion gear, a second pinion gear, a first pawl, and a second pawl. The cable reel has a longitudinally extensive core defining a first core terminus and a second core terminus distal to the first core terminus, a first rim adjacent the first core terminus and defining a first rim perimeter, a second rim adjacent the second core terminus and defining a second rim perimeter, a first set of gear teeth on the first rim perimeter, a second set of gear teeth on the second rim perimeter, and a plurality of cable reel locking pin holes passing through the first rim and each displaced by a radius from the axis of rotation. The winch body has a plurality of winch body locking pin holes each displaced by a radius from the axis of rotation. The locking member in a first configuration passes through a first one of the plurality of cable reel locking pin holes and a first one of the plurality of winch body locking pin holes while a second one of the plurality of cable reel locking pin holes and a second one of the plurality of winch body locking pin holes are angularly offset about the axis of rotation from each other by a first offset angle. In a second configuration, the locking member passes through the second one of the plurality of cable reel locking pin holes and the second one of the plurality of winch body locking pin holes while the first one of the plurality of cable reel locking pin holes and the first one of the plurality of winch body locking pin holes are angularly offset about the axis of rotation from each other by a second offset angle, wherein an absolute value of the second offset angle is equal to an absolute value of the first offset angle, wherein a first number of the plurality of cable reel locking pin holes span a first span angle about the axis of rotation, wherein a second number of the plurality of winch body locking pin holes span a second span angle about the axis of rotation, wherein the first number and the second number are equal and the first and second span angles are unequal, and wherein no more than a unique single one of the plurality of cable reel locking pin holes will align with any one of the plurality of winch body locking pin holes at any relative rotational position between the cable reel and the winch body. The first pinion gear is rotatably supported upon the winch body and has gear teeth coupled with the first set of gear teeth. The absolute value of the first offset angle is less than an angle encompassed and defined by a one of the first pinion gear teeth. A second pinion gear is rotatably supported upon the winch body and has gear teeth coupled with the second set of gear teeth. The first pawl engages with and permits rotation of the first pinion gear in a first rotational direction, while preventing rotation of the first pinion gear in a second direction counter to the first rotational direction. The second pawl engages with and permits rotation of the second pinion gear in the first rotational direction while preventing rotation of the first pinion gear in the second direction counter to the first rotational direction. The tensioned cable is wrapped about the cable reel and passes through the at least one rope guide.

OBJECTS OF THE INVENTION

Exemplary embodiments of the present invention solve inadequacies of the prior art by providing a winch that is suitable for use as a part of a roof edge safety system. To achieve the requirements for such a winch, in the preferred embodiment multiple retention means including at least two pawls and an indexing lock are present so that it will hold tension no matter if it is accidentally impacted. In addition, a set of offset holes in combination with a pin creates a very precise locking position, and a separate drive coupler allows torque wrench tension adjustment independent of pawl position. The winch is further fabricated in a manner that captures the spool, so that the chance of mechanical failure or deconstruction is substantially reduced. The resulting winch is secure, precise, and highly reliable, and may also be released quickly when and only when the user desires.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a winch having multiple spool retention means to prevent accidentally unwinding of the winch. A second object of the invention is to enable the cable to be very precisely tensioned. Another object of the present invention is to enable tensioning and unwinding intuitively, with minimal difference in time required to tension and release when compared to prior art winches. A further object of the invention is to provide an assembly that has a reduced chance of mechanical failure or deconstruction. Yet another object of the present invention is to provide a winch that is suitable for use as a part of a roof edge safety system.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
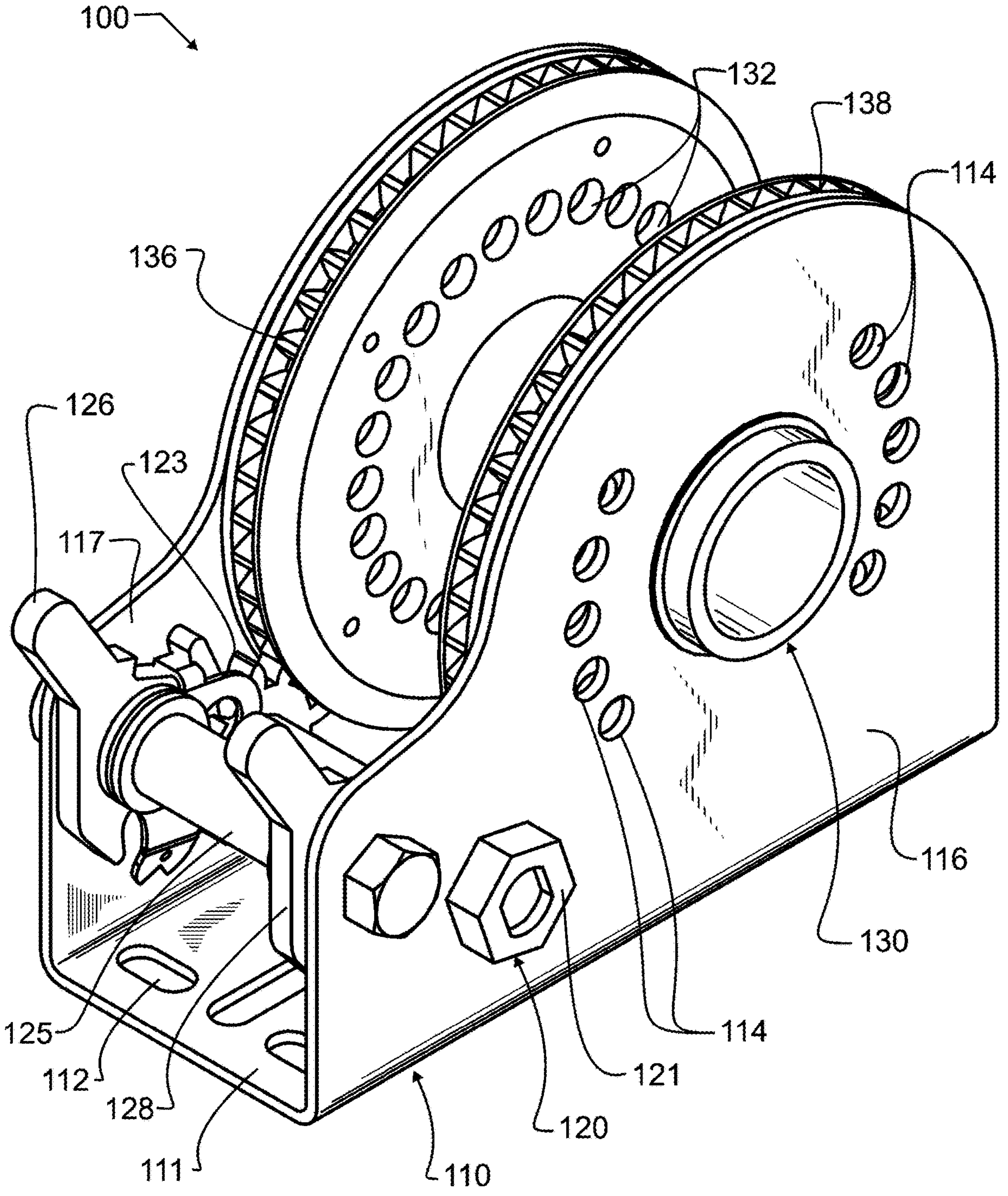
FIGS. 1-4 illustrate a preferred embodiment winch designed in accord with the teachings of the present invention from projected, side, top, and front views, respectively.

Manifested in the preferred embodiment, the present invention provides a winch that is secure, precise, and highly reliable, and may also be released quickly, that is suitable for use as a part of a roof edge safety system and in other diverse applications as may be desired.

In a preferred embodiment of the invention illustrated in FIGS. 1-4, winch 100 has a U-shaped body 110 that provides a structural support for the remaining components of preferred embodiment winch 100. U-shaped body 110 has a base 111 and a pair of vertical faces 116, 117 rising therefrom and spaced from each other. U-shaped body 110 preferably also provides one or more convenient anchor points such as the at least one anchor point 112, which comprises a hole passing through base 111. As illustrated in preferred embodiment winch 100, there are a plurality of anchor holes, any one or more of these holes through which a suitable fastener such as a rivet, bolt, screw, nail, or the like will pass to anchor winch 100 to a suitable external supporting structure. U-shaped body 110 may for exemplary and non-limiting purpose be fabricated from stamped metal, but other fabrication methods and materials that would provide suitable structural support will be used in other alternative embodiments as well.

Mounted within U-shaped body 110 is a winch drive 120 and cable reel 130. Winch drive 120 is configured to rotate cable reel 130. Cable reel 130 in preferred embodiment winch 100 has the geometry of a drum or spool, including a tubular core and two rims or vertical faces at distal ends of the core that serve as winding guides, though other geometries known in the art of reels and spools will be understood to be incorporated herein. When cable reel 130 is rotated in suitable direction, the reel is configured to wind or wrap a rope, cable, chain or other suitable flaccid barrier apparatus. This flaccid barrier apparatus is preferably configured to span between roof edge safety supports and thereby form a safety barrier, such as by passing through one or more rope guides for exemplary and non-limiting purpose as illustrated in the Paterson, Murray, and Thomas et al patents and the commonly owned US pending patent application Ser. No. 18/298,367, each incorporated by reference herein above. Cable reel 130 is preferably captured within and cannot be removed from U-shaped body 110.

As illustrated in FIGS. 1-4, U-shaped body 110 is unitary. In such embodiments, U-shaped body 110 must either be flexible enough for bending and spreading vertical faces 116 and 117 sufficiently to insert cable reel 130 therein, or, alternatively, U-shaped body 110 must be finally formed or shaped after insertion of cable reel 130.

While there are a myriad of known winch drives in the prior art that are suitable, in preferred embodiment winch 100 a winch drive axle 122 rotates about an axis parallel with and adjacent to the axis of rotation of cable reel 130. A screw drive head 121 is provided on one or both ends of winch drive axle 122, external to one or both of vertical faces 116, 117 that, when rotated, will wind or unreel cable from the winch dependent upon the direction of rotation. In preferred embodiment winch 100, the provision of a driving nut or other common drive head enables various tools such as screw, impact, and similar drivers to be used to tension the cables quickly with a high level of tension, speeding up the installation process. The particular use of a nut allows a common socket installed on a torque wrench or a drill with accurate torque setting to be used to very quickly and precisely obtain a desired preset tension within the cable. Nevertheless, other suitable driver heads known in the mechanical arts will be used in various alternative embodiments.

A pair of pinion gears 123, 124 are affixed to winch drive axle 122. In preferred embodiment winch 100, these pinion gears 123, 124 are located on the inside of, but immediately adjacent to vertical faces 116, 117 of U-shaped body 110, and are thereby aligned with cable reel drive gears 136, 138 respectively, to drive cable reel 130. The use of at least two pinion gears 123, 124 provides redundant apparatus to ensure proper rotation of cable reel 130. The use of small pinion gears 123, 124 that have fewer teeth than that of cable reel drive gears 136, 138 provides a gear reduction, allowing a person to more easily and precisely apply tension. Pawl shaft 125 has a longitudinal axis parallel with and adjacent to the axis of rotation of winch drive axle 122, and is located slightly more distal to cable reel 130 than winch drive axle 122. A pair of pawls 126, 128 align and engage with pinion gears 123, 124. Absent any release force applied simultaneously to both pawls 126, 128, these pawls are configured to allow pinion gears 123, 124 to only rotate in a direction that will wind or tighten a rope or cable wrapped about cable reel 130. While the details of the pawls and their operation are not immediately obvious in the illustrations, a large number of the many patents and published applications illustrating various winch constructions incorporated herein above by reference provide ample teachings for a variety of suitable pawl constructions. Further, and as will be appreciated to those skilled in the art of winches and in the broader mechanical arts, there are many other known pawl and ratchet gear combinations and the like which will be understood to be known equivalents that are considered to be incorporated herein in various alternative embodiments.

Preferred embodiment winch 100 has several features that improve safe operation. The first is the use of at least two pawls 126, 128 which provide redundant apparatus to prevent the accidental release of tension held in cable reel 130. To release tension, both pawls 126, 128 must be simultaneously released. During set-up, these pawls allow a person to rotate screw drive head 121 and not worry about accidental release of tension in a rope or cable. Similarly, the use of at least two pinion gears 123, 124 that engage with at least two cable reel drive gears 136, 138 also provides desirable redundancy for similar benefit.

Additionally, locking pin holes 114 are formed in vertical faces 116, 117 of U-shaped body 110. There are also indexing locking pin holes 132, 134 that pass through the side walls of cable reel 130. In preferred embodiment winch 100 these indexing locking pin holes 132, 134 are of a similar diameter to locking pin holes 114, and they are spaced radially from the axis of rotation of cable reel 130 by the same distance. However, indexing locking pin holes 132, 134 differ in angular spacing between holes from the angular spacing between locking pin holes 114, meaning there are either more or fewer holes for a fixed number of degrees of rotation about the axis of rotation of cable reel 130.

Figure 2:
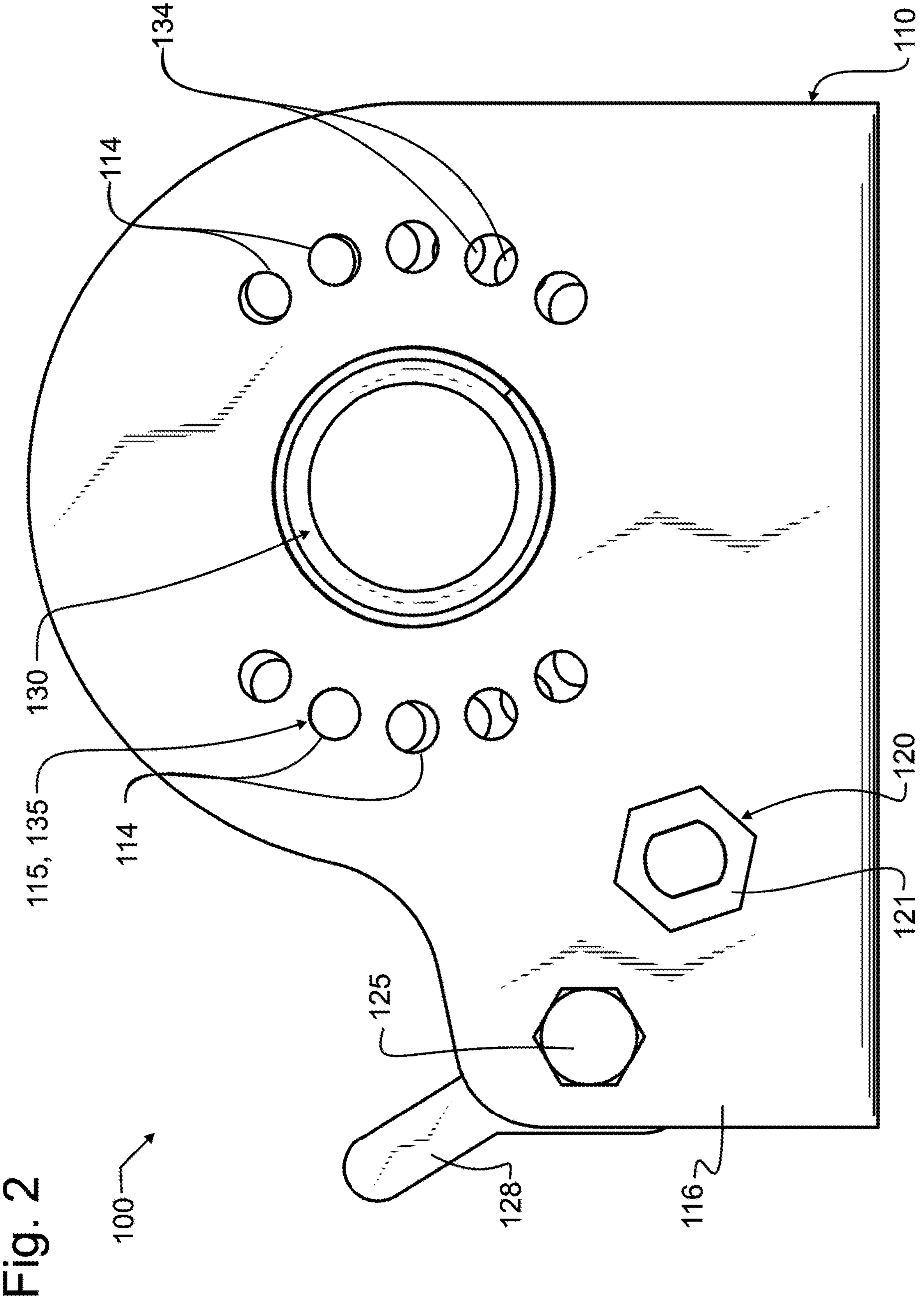
Figure 3:
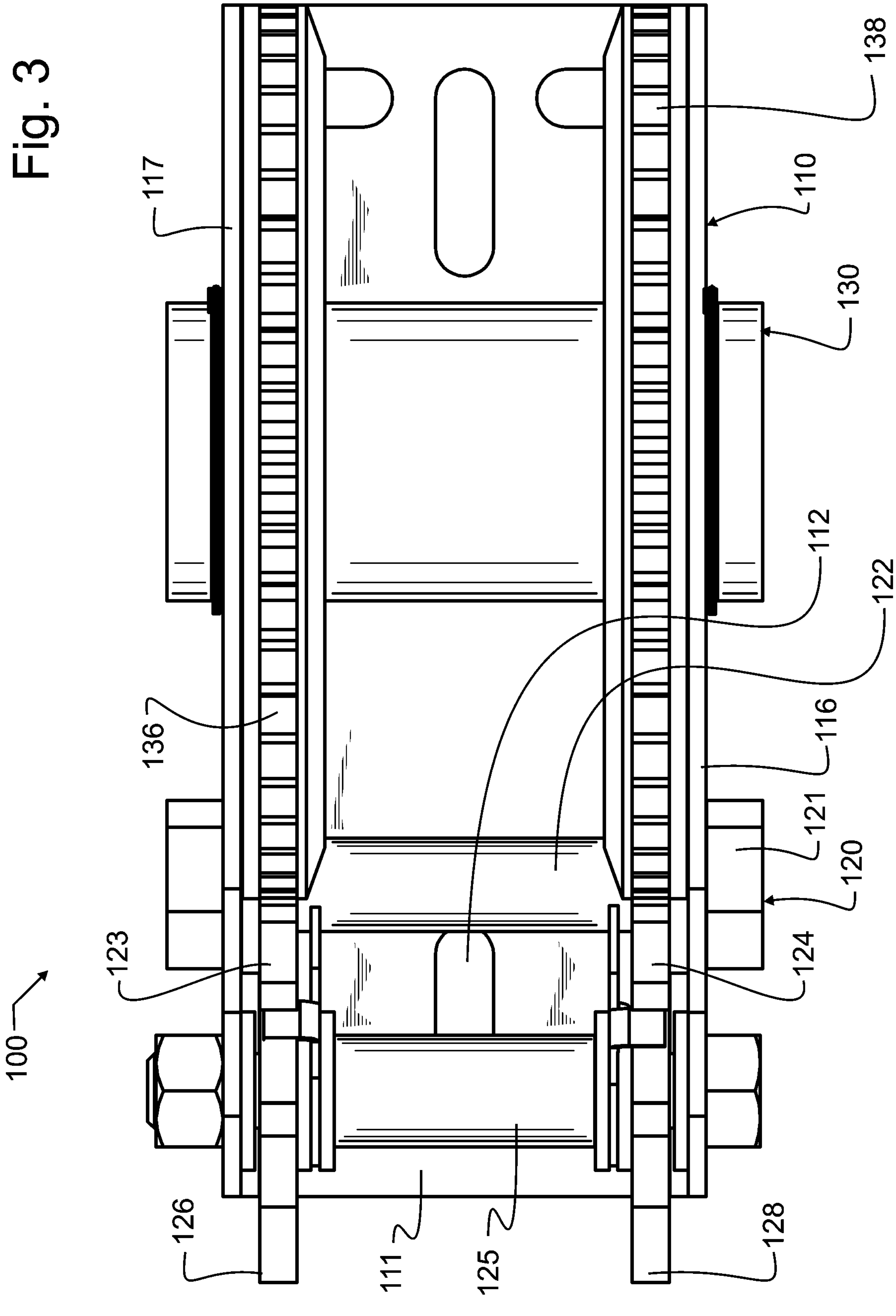
Figure 4:
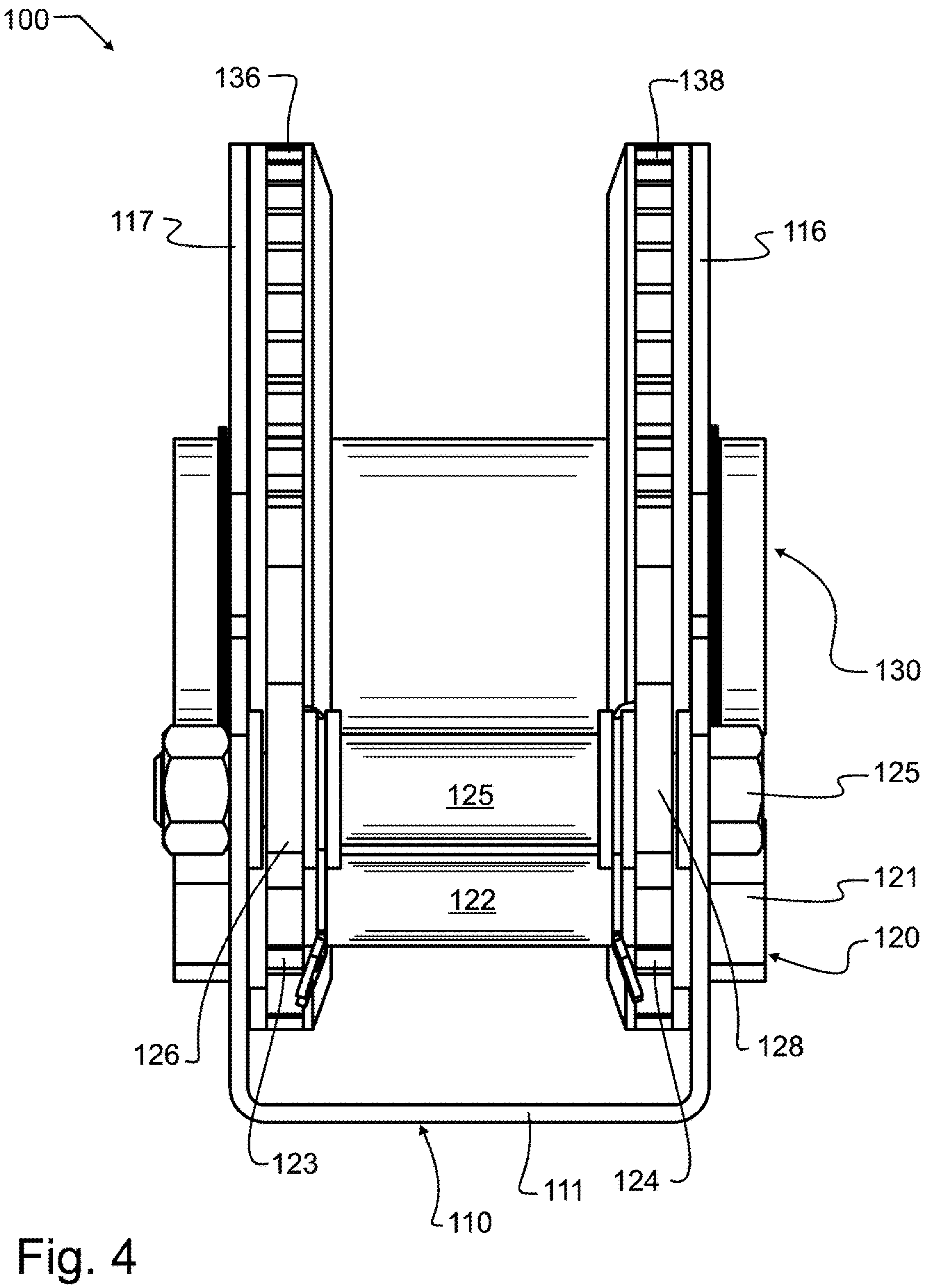

While words do not do this arrangement justice, FIG. 2 shows this feature. As illustrated therein, in preferred embodiment winch 100 there are fewer locking pin holes 114 for a fixed number of degrees of rotation than there are indexing locking pin holes 132, 134. Note that in some alternative embodiments, this would be reversed and there would be more locking pin holes 114 for a fixed number of degrees of rotation than indexing locking pin holes 132, 134. Using either arrangement, the illustrated embodiment is configured so that only one of the locking pin holes 114 will align with only one of each of indexing locking pin holes 132, 134 at a time, also evident from FIG. 2. Locking pin hole 115, which is the aligned one of locking pin holes 114, is aligned with indexing locking pin hole 135, which is the aligned one of indexing locking pin holes 134. While not visible in FIG. 2, from FIG. 1 it will be understood that there is also a single one of indexing locking pin holes 132 that is also sharing alignment with locking pin holes 115, 135.

For exemplary and non-limiting purpose, the indexing of these locking pin holes can occur by stepping the locking pin hole 115 that locking member 240 can be inserted into, sequentially or otherwise, through each one of the ten possible locking pin holes 114 illustrated. If this stepping occurs through all ten holes within the amount of angular rotation that would shift cable reel drive gear 136 one tooth, then the indexing locking pin holes will allow the precision of rotary position to be ten times more precise in locking cable reel 130 in a particular position than could be achieved with the pawls 126, 128 alone.

Purely for exemplary and non-limiting purpose, if there are 36 teeth in cable reel drive gears 136, 138, then every step of pawls 126, 128 will move the cable reel drive gears 136, 138 ten degrees. This is calculated as 360 degrees to complete a full circle, divided by the exemplary 36 teeth in cable reel drive gears 136, 138, or one tooth for every ten degrees. If, in the time it takes for movement of one step of pawls 126, 128 there are ten index steps that will step hole alignment through each one of the ten possible locking pin holes 114 illustrated, then each ten degree step is further divided by ten, meaning the indexing locking pin holes 132, 134, 135 in combination with locking pin holes 114, 115 are precise in this example to one degree of rotation of cable reel 130. In other words, in the preferred and at least some alternative embodiments, indexing locking pin holes 132, 134, 135 in combination with locking pin holes 114, 115 are configured to divide the angular increment of a single pawl step into a plurality of different indexing locking pin hole alignments.

The angular offsets are easiest to understand and use if they are arranged so that the aligned holes 115, 135 move sequentially from one set of holes 114, 134 to the next adjacent holes 114, 134. However, it should be understood from the present disclosure that the angles of offset for the locking pin holes do not need to be constant or arranged sequentially around the cable reel axis of rotation. In fact, they are not even as illustrated. As again visible in FIG. 2, there are two groups of five holes, one group of five to the left and the other group of five to the right of a vertical axis passing through the reel axis of rotation. Instead, a desired feature of the preferred and alternative embodiment winches 100, 200 is the dividing of the the angle of rotation required to reposition a pawl to a next position.

While in the preferred and alternative embodiment winches 100, 200 illustrated herein, there is only one set of locking pin holes 115, 135 that will be aligned at any one position of cable reel 130 relative to U-shaped body 110, this has been done solely for the purposes of simplification of device operation. In other words, it is quite intuitive for a person using the preferred and alternative embodiment winches 100, 200 illustrated herein to know in advance that there will only be one hole set 115, 135 that the locking member 240 will pass through at any given position. Nevertheless, in some alternative embodiments the indexing holes may be arranged so that there may be more than one set of holes that align at a given relative position between cable reel 130 and U-shaped body 110, thereby permitting more than one locking member to be inserted at such positions.

While the locking pin holes 114, 115 could wrap evenly and consistently around the axis of rotation of cable reel 130, this is undesirable since the insertion of locking member 240 would in some hole combinations then potentially interfere with or be blocked by the cable wrapped about and coming off of cable reel 130. To avoid interference therebetween, in the preferred and alternative embodiment winches 100, 200 illustrated herein, the locking pin holes 114 do not wrap entirely about the axis of rotation of cable reels 130, 230, and instead these holes 114 are located loosely in alignment with the winch drive axles 122, 222 and pawl shafts 125, 225, and other areas where the cable will be less likely to be passing through in interfering position.

Figure 5:
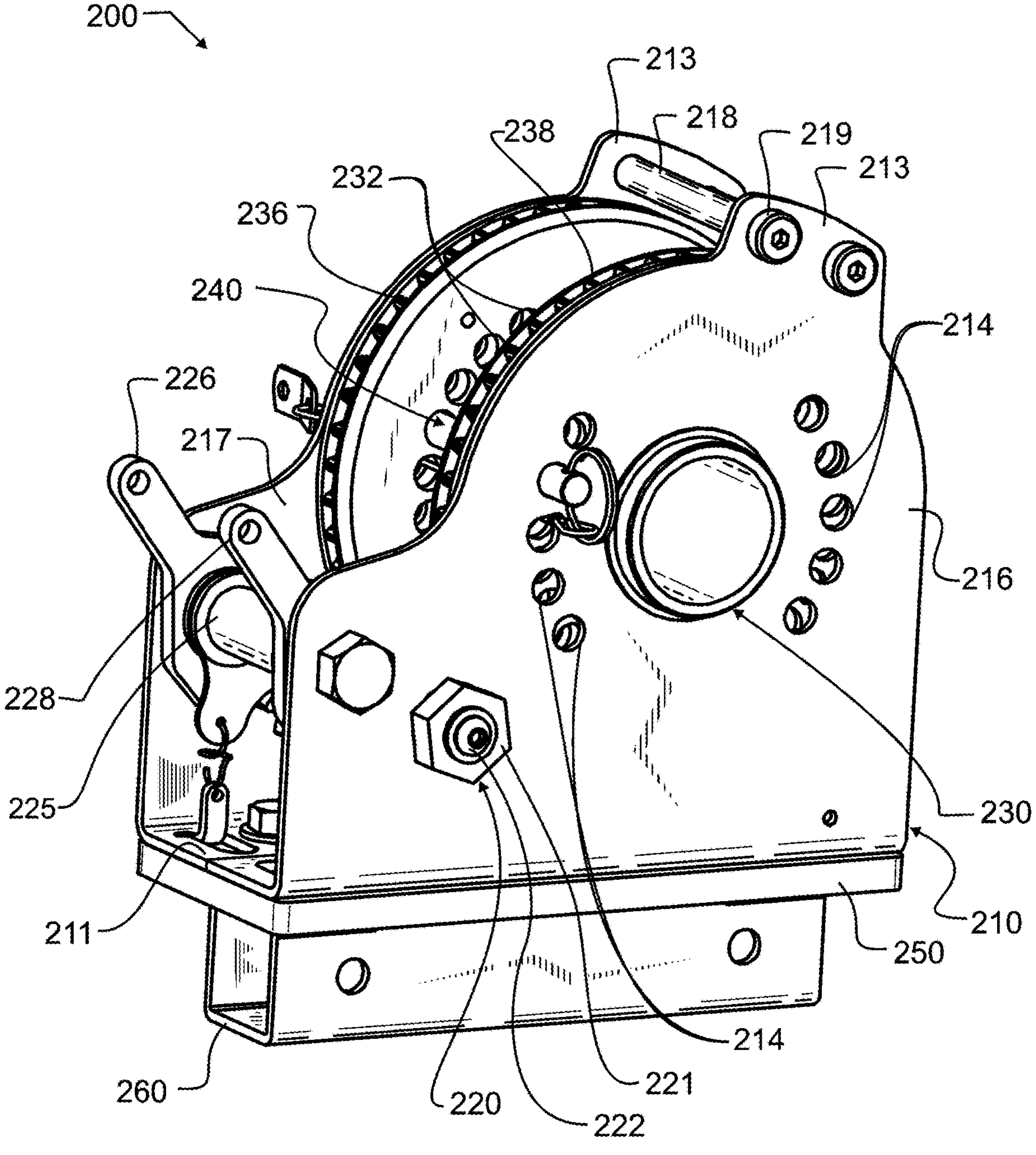
FIG. 5 illustrates a first alternative embodiment winch designed in accord with the teachings of the present invention from a projected view.

In preferred embodiment winch 100, a locking member 240 such as illustrated for exemplary and non-limiting purpose in FIG. 5 will pass entirely through each of the aligned locking pin holes 115, 132, and 135, including through both vertical faces 116, 117 and both vertical faces of cable reel 130. Locking member 240 is illustrated in FIG. 5 as a ring-grip quick-release pin. However, in alternative embodiments other suitable apparatuses will be used. These may, for exemplary and non-limiting purpose, include such apparatuses as a pin, bolt, tube, rod, or wire.

Passing a locking member such as locking member 240 through these two spaced apart pairs of holes provides very positive and strong locking of cable reel 130 relative to U-shaped body 110. Nevertheless, in some alternative embodiments a suitable locking member will only pass through one of the two vertical faces 116, 117 and one vertical face of cable reel 130. In such cases, the locking member may comprise a different type of apparatus, for exemplary and non-limiting purpose such as a plug, dimple, button, or much shorter pin, bolt, tube, rod, wire, or other locking apparatus.

To use preferred embodiment winch 100, a person will rotate screw drive head 121 to properly tension a rope, cable, or the like that is in part wrapped about cable reel 130, relying upon pawls 126, 128 to prevent the accidental release of tension held in cable reel 130. As described herein above, precise tension within a cable can quickly be obtained with a torque wrench, drill, or the like with accurate torque setting. When the proper tension is obtained, one of locking pin holes 114 will align with one of indexing locking pin holes 132, 134. The person will then secure cable reel 130 by inserting a locking member 240 such as a pin or the like as described herein above into these aligned holes, which will prevent the spinning of cable reel 130. The locking member 240 passing through the single pair of properly aligned locking pin holes 115, 135 will provide more secure and absolute location locking than possible with the pawls, while also substantially reducing backlash. Nevertheless, should the locking member somehow become accidentally dislodged, pawls 126, 128 will still provide multiple safety redundancies.

Two alternative embodiments of apparatus designed in accord with the present invention have been illustrated in the figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

In some alternative embodiments, such as in the first alternative embodiment winch 200 illustrated in FIG. 5, U-shaped body 210 is divided into two separate parts. The particular location of the split line will be determined by a designer. As illustrated, the split is approximately equidistant between vertical faces 216, 217, along a central vertical plane approximately centered in base 211 extending transverse to the rotary axis of cable reel 230. In such embodiments, a separate anchor plate 250 is preferably provided beneath the base 211 of U-shaped body 210, and fasteners are passed through each portion of U-shaped body 210 into anchor plate 250. In some embodiments where so desired, after assembly of cable reel 230 within U-shaped body 210 the separate portions of U-shaped body 210 are welded together into a unitary structure.

In some alternative embodiments, and again as illustrated in first alternative embodiment winch 200 illustrated in FIG. 5, additional securement is provided by extensions 213 of the vertical faces 216, 217 of U-shaped body 210 above cable reel 230, for exemplary and non-limiting purpose such as most distal to winch drive axle 222. Suitable fasteners 219 are passed through spacer tubes 218 from vertical face 216 of U-shaped body 210 to the other vertical face 217, thereby providing additional reinforcement to U-shaped body 210 and thereby better retaining cable reel 230 therein. In some alternative embodiments, additional hardware is also provided, for exemplary and non-limiting purpose such as the stanchion mounting bracket 260 affixed to the underside of anchor plate 250.

The preferred and alternative embodiment winches 100, 200 can be used in combination with a roof edge safety system such as described in the Paterson, Murray, and Thomas et al patents and our commonly owned US pending patent application Ser. No. 18/298,367, each incorporated by reference herein above, to provide many benefits. One very basic benefit is providing a consistent rope or cable height that can optionally support flags to alert workers to the edge of the roof. While this first benefit may be found when using many small poles or dowels deployed in the prior art, the winch designed in accord with the teachings of the present invention also will substantially stop the cable from sagging even with substantial distances between the supports. This allows for fewer high quality reusable supports to be required. Furthermore, as the cables are capable of being substantially and precisely tensioned, they provide immediate feedback to anyone who comes into contact with them, thereby alerting individuals to the edge at first contact. In contrast, a loose rope with or without flags needs to be moved far enough out of position that it starts to pull on the stationary supports before the user finally becomes aware that they are in contact with the rope.

While the foregoing details what is felt to be the preferred embodiment of the invention, no material limitations to the scope of the claimed invention are intended. For exemplary and non-limiting purpose, while the preferred embodiment winch 100 is described herein for primary application in combination with roof edge safety apparatus, upon a reading of the present disclosure those familiar with the applications of winches will further understand and appreciate that winches designed in accord with the teachings of the present invention will have similar applicability for other purposes besides roof edge safety, particularly those that require safety redundancies or precise tensioning. As can be appreciated, the variants that would be possible from a reading of the present disclosure are too many in number for individual listings herein, though they are understood to be included in the present invention. Further, features and design alternatives that would be obvious to one of ordinary skill in the art are considered to be incorporated herein. The scope of the invention is set forth and particularly described in the claims herein below.

We claim:

1. In combination, a building and a roof edge safety system, said building comprising:
  at least one elevational wall; and
  at least one roof adjoining said at least one elevational wall;
said roof edge safety system comprising:
  at least one roof edge safety support having
    a standard coupled adjacent to said at least one roof and rising to a top elevation above said roof, and
    at least one rope guide;
  at least one winch support having
    a standard coupled adjacent to said at least one roof and rising to a top elevation above said roof;
  at least one winch supported by said at least one winch support above said roof, said winch having
    a cable reel defining an axis of rotation and having a plurality of cable reel locking pin holes each displaced by a radius from said axis of rotation,
    a winch body located adjacent said cable reel, affixed to said standard, and having a plurality of winch body locking pin holes each displaced by a radius from said axis of rotation, and
    a locking member in a first configuration passing through a first one of said plurality of cable reel locking pin holes and a first one of said plurality of winch body locking pin holes while a second one of said plurality of cable reel locking pin holes and a second one of said plurality of winch body locking pin holes are angularly offset about said axis of rotation from each other by a first offset angle, and in a second configuration passing through said second one of said plurality of cable reel locking pin holes and said second one of said plurality of winch body locking pin holes while said first one of said plurality of cable reel locking pin holes and said first one of said plurality of winch body locking pin holes are angularly offset about said axis of rotation from each other by a second offset angle, wherein an absolute value of said second offset angle is equal to an absolute value of said first offset angle; and
  a tensioned cable wrapped about said cable reel and passing through said at least one rope guide.

2. The combination building and roof edge safety system of claim 1, wherein a first number of said plurality of cable reel locking pin holes span a first span angle about said axis of rotation, and wherein a second number of said plurality of winch body locking pin holes span a second span angle about said axis of rotation, and wherein said first number and said second number are equal and said first and second span angles are unequal.

3. The combination building and roof edge safety system of claim 2, wherein each individual one of said first number of said plurality of cable reel locking pin holes is angularly offset from adjacent ones of said first number of said plurality of cable reel locking pin holes by a third offset angle, and wherein each individual one of said first number of said plurality of plurality of winch body locking pin holes is angularly offset from adjacent ones of said first number of said plurality of winch body locking pin holes by a fourth offset angle, said third and fourth offset angles unequal.

4. The combination building and roof edge safety system of claim 3, wherein no more than a unique single one of said plurality of cable reel locking pin holes will align with any one of said plurality of winch body locking pin holes at any relative rotational position between said cable reel and said winch body.

5. The combination building and roof edge safety system of claim 1, wherein said cable reel further comprises:

a longitudinally extensive core defining a first core terminus and a second core terminus distal to said first core terminus;

a first rim adjacent said first core terminus and defining a first rim perimeter; and a first set of gear teeth on said first rim perimeter; and wherein said at least one winch further comprises:

a first pinion gear rotatably supported upon said winch body and having gear teeth coupled with said first set of gear teeth; and a first pawl engaging with and permitting rotation of said first pinion gear in a first rotational direction while preventing rotation of said first pinion gear in a second direction counter to said first rotational direction.

6. The combination building and roof edge safety system of claim 5, wherein said cable reel further comprises:

a second rim adjacent said second core terminus and defining a second rim perimeter; and a second set of gear teeth on said second rim perimeter; and wherein said at least one winch further comprises:

a second pinion gear rotatably supported upon said winch body and having gear teeth coupled with said second set of gear teeth; and a second pawl engaging with and permitting rotation of said second pinion gear in said first rotational direction while preventing rotation of said first pinion gear in said second direction counter to said first rotational direction.

7. The combination building and roof edge safety system of claim 6, wherein said at least one winch further comprises:

a first pawl release that is selectively operable to release said first pawl from engaging with said first pinion gear, and thereby permitting said first pinion gear to rotate independently of said first pawl; and a second pawl release that is selectively operable to release said second pawl from engaging with said first pinion gear, and thereby permitting said second pinion gear to rotate independently of said second pawl;

said first and second pawl releases selectively operable independently of each other.

8. The combination building and roof edge safety system of claim 5, wherein said absolute value of said first offset angle is less than an angle encompassed and defined by a one of said first pinion gear teeth.

9. The combination building and roof edge safety system of claim 1, wherein said at least one roof edge safety support further comprises an edge clamp spanning and applying a clamping force to at least one of said at least one roof and said at least one elevational wall, a clamp driver generating said clamping force, and a standard coupled adjacent to a first terminus to and rising from said edge clamp and extending therefrom.

10. The combination building and roof edge safety system of claim 9, wherein said building further comprises a parapet adjoining with and elevated with respect to said at least one roof and said at least one elevational wall, said parapet having at least two separate parapet elevational surfaces rising above said roof and meeting at a parapet top; and wherein said edge clamp spans said parapet top and applies a clamping force to said at least two separate parapet elevational surfaces.

11. A winch, comprising:

a cable reel defining an axis of rotation and having a plurality of cable reel locking pin holes each displaced by a radius from said axis of rotation;

a winch body located adjacent said cable reel and having a plurality of winch body locking pin holes each displaced by a radius from said axis of rotation; and a locking member in a first configuration passing through a first one of said plurality of cable reel locking pin holes and a first one of said plurality of winch body locking pin holes while a second one of said plurality of cable reel locking pin holes and a second one of said plurality of winch body locking pin holes are angularly offset about said axis of rotation from each other by a first offset angle, and in a second configuration passing through said second one of said plurality of cable reel locking pin holes and said second one of said plurality of winch body locking pin holes while said first one of said plurality of cable reel locking pin holes and said first one of said plurality of winch body locking pin holes are angularly offset about said axis of rotation from each other by a second offset angle, wherein an absolute value of said second offset angle is equal to an absolute value of said first offset angle; and a tensioned cable wrapped at least partially about said cable reel.

12. The winch of claim 11, wherein a first number of said plurality of cable reel locking pin holes span a first span angle about said axis of rotation, and wherein a second number of said plurality of winch body locking pin holes span a second span angle about said axis of rotation, and wherein said first number and said second number are equal and said first and second span angles are unequal.

13. The winch of claim 12, wherein each individual one of said first number of said plurality of cable reel locking pin holes is angularly offset from adjacent ones of said first number of said plurality of cable reel locking pin holes by a third offset angle, and wherein each individual one of said first number of said plurality of plurality of winch body locking pin holes is angularly offset from adjacent ones of said first number of said plurality of winch body locking pin holes by a fourth offset angle, said third and fourth offset angles unequal.

14. The winch of claim 13, wherein no more than a unique single one of said plurality of cable reel locking pin holes will align with any one of said plurality of winch body locking pin holes at any relative rotational position between said cable reel and said winch body.

15. The winch of claim 11, wherein said cable reel further comprises:

a longitudinally extensive core defining a first core terminus and a second core terminus distal to said first core terminus;

a first rim adjacent said first core terminus and defining a first rim perimeter; and a first set of gear teeth on said first rim perimeter; and wherein said at least one winch further comprises:

a first pinion gear rotatably supported upon said winch body and having gear teeth coupled with said first set of gear teeth; and a first pawl engaging with and permitting rotation of said first pinion gear in a first rotational direction while preventing rotation of said first pinion gear in a second direction counter to said first rotational direction.

16. The winch of claim 15, wherein said cable reel further comprises:

a second rim adjacent said second core terminus and defining a second rim perimeter; and a second set of gear teeth on said second rim perimeter; and wherein said at least one winch further comprises:

a second pinion gear rotatably supported upon said winch body and having gear teeth coupled with said second set of gear teeth; and a second pawl engaging with and permitting rotation of said second pinion gear in said first rotational direction while preventing rotation of said first pinion gear in said second direction counter to said first rotational direction.

17. The winch of claim 16, wherein said at least one winch further comprises:

a first pawl release that is selectively operable to release said first pawl from engaging with said first pinion gear, and thereby permitting said first pinion gear to rotate independently of said first pawl; and a second pawl release that is selectively operable to release said second pawl from engaging with said first pinion gear, and thereby permitting said second pinion gear to rotate independently of said second pawl;

said first and second pawl releases selectively operable independently of each other.

18. The winch of claim 15, wherein said absolute value of said first offset angle is less than an angle encompassed and defined by a one of said first pinion gear teeth.

19. In combination, a building and a roof edge safety system, said building comprising:

at least one elevational wall; and at least one roof adjoining said at least one elevational wall;

said roof edge safety system comprising:

at least one roof edge safety support having a standard coupled adjacent to said at least one roof and rising to a top elevation above said roof, and at least one rope guide;

at least one winch support having a standard coupled adjacent to said at least one roof and rising to a top elevation above said roof;

at least one winch supported by said at least one winch support above said roof, said winch having a cable reel defining an axis of rotation and having a longitudinally extensive core defining a first core terminus and a second core terminus distal to said first core terminus, a first rim adjacent said first core terminus and defining a first rim perimeter, a second rim adjacent said second core terminus and defining a second rim perimeter, a first set of gear teeth on said first rim perimeter, a second set of gear teeth on said second rim perimeter, and a plurality of cable reel locking pin holes passing through said first rim and each displaced by a radius from said axis of rotation, a winch body located adjacent said cable reel, affixed to said standard, and having a plurality of winch body locking pin holes each displaced by a radius from said axis of rotation, and a locking member in a first configuration passing through a first one of said plurality of cable reel locking pin holes and a first one of said plurality of winch body locking pin holes while a second one of said plurality of cable reel locking pin holes and a second one of said plurality of winch body locking pin holes are angularly offset about said axis of rotation from each other by a first offset angle, and in a second configuration passing through said second one of said plurality of cable reel locking pin holes and said second one of said plurality of winch body locking pin holes while said first one of said plurality of cable reel locking pin holes and said first one of said plurality of winch body locking pin holes are angularly offset about said axis of rotation from each other by a second offset angle, wherein an absolute value of said second offset angle is equal to an absolute value of said first offset angle, wherein a first number of said plurality of cable reel locking pin holes span a first span angle about said axis of rotation, wherein a second number of said plurality of winch body locking pin holes span a second span angle about said axis of rotation, wherein said first number and said second number are equal and said first and second span angles are unequal, and wherein no more than a unique single one of said plurality of cable reel locking pin holes will align with any one of said plurality of winch body locking pin holes at any relative rotational position between said cable reel and said winch body, a first pinion gear rotatably supported upon said winch body and having gear teeth coupled with said first set of gear teeth, a second pinion gear rotatably supported upon said winch body and having gear teeth coupled with said second set of gear teeth, a first pawl engaging with and permitting rotation of said first pinion gear in a first rotational direction while preventing rotation of said first pinion gear in a second direction counter to said first rotational direction, and a second pawl engaging with and permitting rotation of said second pinion gear in said first rotational direction while preventing rotation of said first pinion gear in said second direction counter to said first rotational direction; and a tensioned cable wrapped about said cable reel and passing through said at least one rope guide;

wherein said absolute value of said first offset angle is less than an angle encompassed and defined by a one of said first pinion gear teeth.

20. The combination building and roof edge safety system of claim 19, wherein said at least one winch further comprises:

a first pawl release that is selectively operable to release said first pawl from engaging with said first pinion gear, and thereby permitting said first pinion gear to rotate independently of said first pawl; and a second pawl release that is selectively operable to release said second pawl from engaging with said first pinion gear, and thereby permitting said second pinion gear to rotate independently of said second pawl;

said first and second pawl releases selectively operable independently of each other.

* * * * *